(12) United States Patent
Nagel et al.

(10) Patent No.: US 11,345,068 B2
(45) Date of Patent: May 31, 2022

(54) METHOD OF EMBEDDING OPTO-ELECTRONIC COMPONENTS IN A LAYER

(71) Applicant: OSRAM Opto Semiconductors GmbH, Regensburg (DE)

(72) Inventors: Peter Nagel, Regensburg (DE); Tobias Gebuhr, Regensburg (DE)

(73) Assignee: OSRAM OLED GmbH, Regensburg (DE)

( * ) Notice: Subject to any disclaimer, the term of this patent is extended or adjusted under 35 U.S.C. 154(b) by 577 days.

(21) Appl. No.: 16/227,789

(22) Filed: Dec. 20, 2018

(65) Prior Publication Data
US 2019/0193314 A1   Jun. 27, 2019

(30) Foreign Application Priority Data
Dec. 22, 2017   (DE) ..................... 10 2017 131 110.6

(51) Int. Cl.
*B29C 45/14* (2006.01)
*B29C 33/14* (2006.01)
*B29L 31/34* (2006.01)
*B29C 45/26* (2006.01)
*B29L 31/00* (2006.01)
(Continued)

(52) U.S. Cl.
CPC ........ *B29C 45/14639* (2013.01); *B29C 33/14* (2013.01); *B29C 45/26* (2013.01); *B29C 33/42* (2013.01); *B29C 39/10* (2013.01); *B29C 45/14836* (2013.01); *B29C 2033/0094* (2013.01); *B29C 2045/14098* (2013.01); *B29C 2045/14163* (2013.01); *B29D 11/00807* (2013.01); *B29L 2031/34* (2013.01); *B29L 2031/3481* (2013.01); *B29L 2031/747* (2013.01)

(58) Field of Classification Search
CPC ........ B29C 45/14639; B29C 45/14836; B29C 2045/14663; B29C 2045/14163; B29C 2045/14098
See application file for complete search history.

(56) References Cited

U.S. PATENT DOCUMENTS 5,319,522 A * 6/1994 Mehta ............... B29C 45/14639
174/521
5,766,650 A * 6/1998 Peters ............... B29C 45/14655
425/116
(Continued)

FOREIGN PATENT DOCUMENTS

DE   10 2011 078 906 A1   1/2013
JP            H091596 A *   1/1997   ....... H01L 2224/451
(Continued)

*Primary Examiner* — Benjamin A Schiffman
(74) *Attorney, Agent, or Firm* — DLA Piper LLP (US)

(57) ABSTRACT

A method of embedding opto-electronic components in a layer, wherein the components are disposed beside one another to be spaced apart on a carrier, including providing a molding tool having a bearing plate, wherein the bearing plate on a lower side includes resilient bearing regions, bringing the bearing plate by way of the resilient bearing regions to bear on upper sides of the components, filling an intermediate space between the components, the carrier, and the bearing plate with a molding material, curing the molding material to form the layer, and removing the molding tool from the layer and the embedded components.

8 Claims, 6 Drawing Sheets

(51) Int. Cl.
  *B29C 39/10* (2006.01)
  *B29C 33/42* (2006.01)
  *B29C 33/00* (2006.01)
  *B29D 11/00* (2006.01)

(56) References Cited

U.S. PATENT DOCUMENTS

| | | | | |
|---|---|---|---|---|
| 5,923,959 | A * | 7/1999 | Mess | H01L 24/97 |
| | | | | 438/126 |
| 6,329,224 | B1 * | 12/2001 | Nguyen | H01L 24/97 |
| | | | | 438/127 |
| 6,472,252 | B2 * | 10/2002 | Mess | B29C 45/14655 |
| | | | | 257/E21.504 |
| 7,448,861 | B2 * | 11/2008 | Koike | H01L 27/14825 |
| | | | | 425/116 |
| 10,882,228 | B2 * | 1/2021 | Okabe | B29C 45/14065 |
| 2010/0132190 | A1 * | 6/2010 | Grosso | H05K 3/284 |
| | | | | 29/841 |
| 2014/0206122 | A1 * | 7/2014 | Fernandez | B81B 7/0058 |
| | | | | 438/48 |
| 2015/0318126 | A1 * | 11/2015 | Hessler | B29C 45/14778 |
| | | | | 200/5 R |
| 2016/0368177 | A1 * | 12/2016 | Kasai | B32B 27/06 |
| 2018/0117813 | A1 * | 5/2018 | Ho | B29C 45/14336 |
| 2020/0262114 | A1 * | 8/2020 | Kurita | B29C 39/10 |

FOREIGN PATENT DOCUMENTS

| | | | | |
|---|---|---|---|---|
| WO | WO-2005043612 A1 * | 5/2005 | ....... | B29C 45/14836 |
| WO | WO-2014199733 A1 * | 12/2014 | ........... | H01L 21/565 |
| WO | WO-2015107758 A1 * | 7/2015 | ........... | H01L 23/552 |

* cited by examiner

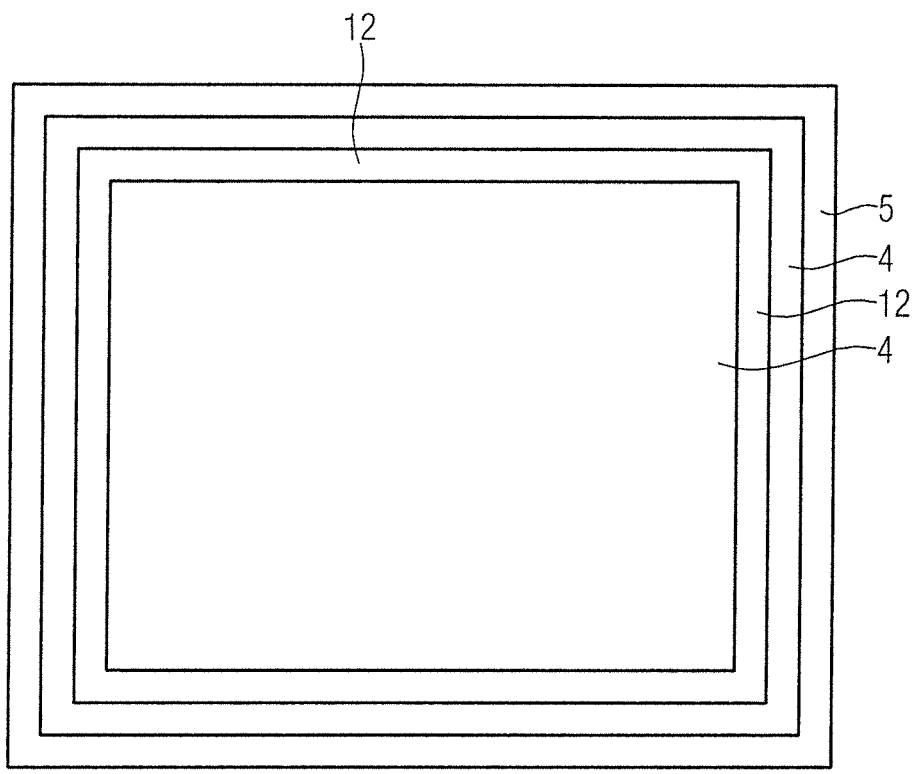
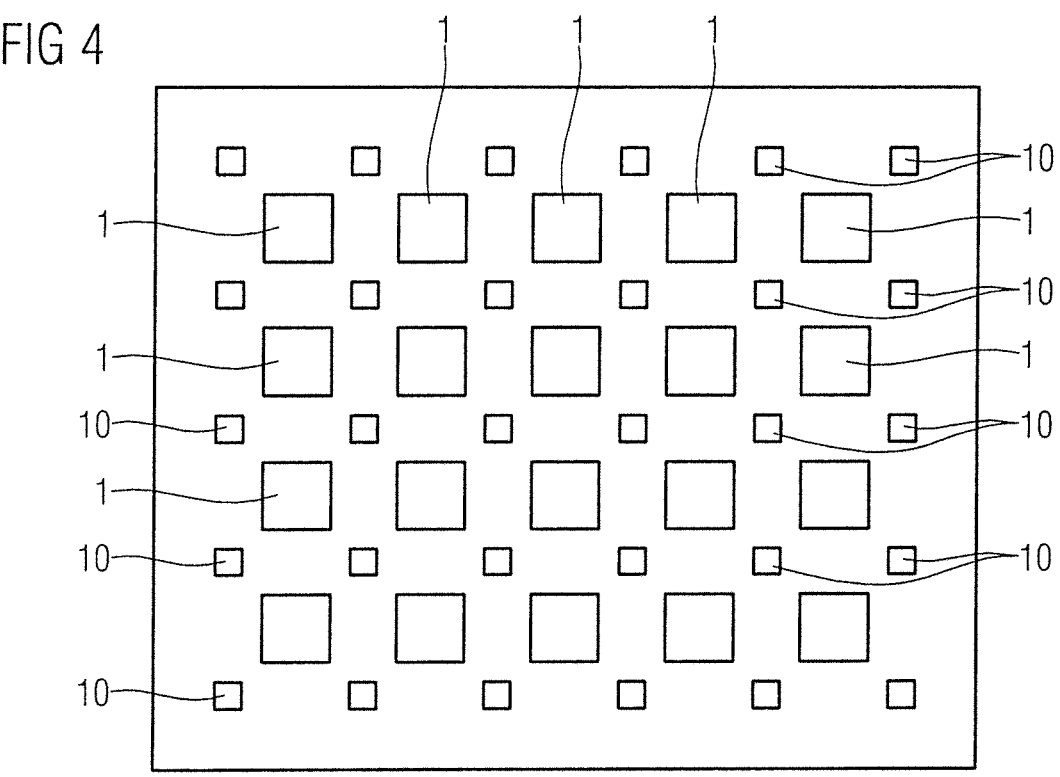

METHOD OF EMBEDDING OPTO-ELECTRONIC COMPONENTS IN A LAYER

TECHNICAL FIELD

This disclosure relates to a method of embedding opto-electronic components in a layer, and a molding tool used to carry out the method.

BACKGROUND

It is known for opto-electronic components to be embedded in a layer by an injection-molding method or a foil-assisted mold method. However, damage to the components or overmolding of an upper side of the components can arise herein.

It could therefore be helpful to provide an improved method of embedding opto-electronic components in a layer and an improved molding tool used to embed opto-electronic components in a layer.

SUMMARY

We provide a method of embedding opto-electronic components in a layer, wherein the components are disposed beside one another to be spaced apart on a carrier, including providing a molding tool having a bearing plate, wherein the bearing plate on a lower side includes resilient bearing regions, bringing the bearing plate by way of the resilient bearing regions to bear on upper sides of the components, filling an intermediate space between the components, the carrier, and the bearing plate with a molding material, curing the molding material to form the layer, and removing the molding tool from the layer and the embedded components.

We also provide a method of embedding opto-electronic components in a layer, wherein the components are disposed beside one another to be spaced apart on a carrier, including providing a molding tool having a bearing plate, wherein the bearing plate on a lower side comprises resilient bearing regions, bringing the bearing plate by way of the resilient bearing regions to bear on upper sides of the components, filling an intermediate space between the components, the carrier, and the bearing plate with a molding material, curing the molding material to form the layer, and removing the molding tool from the layer and the embedded components, wherein the molding tool includes a compression plate, the compression plate on a lower side includes bearing elements, the bearing elements are mutually spaced apart, the compression plate by way of the bearing elements bears on an upper side of the bearing plate, when filling the molding material into the intermediate space the compression plate by way of the bearing elements presses the bearing plate against the components, the bearing plate is formed from a resilient material, the lower side of the bearing plate represents the resilient bearing regions, and the bearing elements of the compression plate are disposed to be at least in part laterally offset in relation to the components.

We further provide a molding tool that embeds opto-electronic components in a layer, having a bearing plate, wherein the bearing plate includes resilient bearing regions, the resilient bearing regions are provided for being brought to bear on components which are disposed on a carrier, the bearing plate is configured to delimit an intermediate space for filling molding material between the bearing plate, the components, and the carrier.

BRIEF DESCRIPTION OF THE DRAWINGS

FIG. 3 shows a schematic plan view of a lower side of a bearing plate.

FIG. 4 shows a schematic illustration of the arrangement of the components and of the bearing elements of the compression plate of FIG. 1.

LIST OF REFERENCE SIGNS

Figure 1:
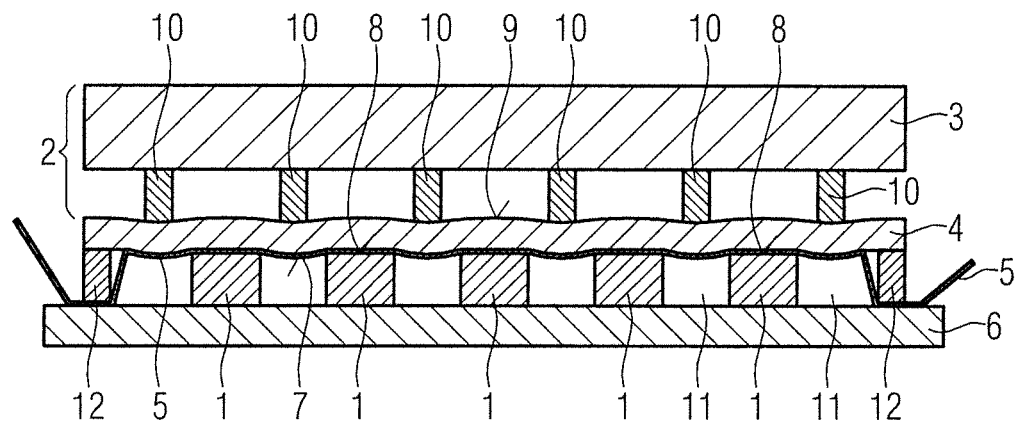
FIG. 1 shows a schematic cross section through a device that embeds components in a layer.

1 Component
2 Molding tool
3 Compression plate
4 Bearing plate
5 Film
6 Carrier
7 Lower side of the bearing plate
8 Upper side of the component
9 Upper side of the bearing plate
10 Bearing element
11 Intermediate space
12 Frame
13 Bearing block
14 Base plate
15 Spring element
16 Layer
17 Bearing face of bearing block

DETAILED DESCRIPTION

One advantage of our method lies in that the contact pressure on the components is reduced and an upper side of the components is nevertheless securely protected in relation to an application of molding material. This is achieved in that a molding tool having a bearing plate is provided, wherein the bearing plate on the lower side comprises resilient bearing regions. The resilient bearing regions of the bearing plate are brought to bear on upper sides of the components. The components are disposed on a carrier. An intermediate space between the components and the carrier and the bearing plate is subsequently filled with a molding material. The molding material is cured to form the layer.

The molding tool is subsequently removed. The layer having the components can be singularized into individual components, for example. The opto-electronic components can be configured in the form of light-emitting components, in particular in the form of light-emitting diodes, for example. On account of the resilient bearing regions of the bearing plate, components of dissimilar heights or else components having upper sides disposed in an inclined manner can be covered more reliably and protected from molding material by way of a bearing plate. The molding tool can thus be brought to bear on the components at a lower pressure. The risk of damage to the components is reduced on account thereof.

The molding tool may comprise a compression plate, wherein the compression plate on a lower side comprises bearing elements. The bearing elements are mutually spaced apart. The bearing elements are disposed in a second grid, for example. The compression plate by way of the bearing elements bears on an upper side of the bearing plate. When filling the molding material into the intermediate space, the compression plate by way of the bearing elements is pressed against the upper side of the bearing plate. The bearing elements are disposed to be at least in part laterally beside the components. In this way, the compression plate with the aid of the bearing elements can exert a high pressure on the bearing plate. On account of the bearing elements, the pressure can be transmitted onto the bearing plate in regions between the components. The direct pressure on the components can be reduced on account thereof. The risk of damage to the components it is thus reduced.

The bearing plate may be formed from a resilient material. The lower side of the bearing plate thus provides the resilient bearing regions. For example, the bearing elements of the compression plate can be disposed to be at least in part laterally beside the components. For example, all bearing regions are disposed to be laterally beside the components. The transmission of pressure between the compression plate and the bearing plate can thus be performed between the components. The pressure by virtue of the resilient configuration of the bearing plate can be transmitted to the components in a more uniform manner. For example, the bearing plate can flex in the region between the components. On account thereof, height differentials between the components and upper sides of the components disposed in an inclined manner can be equalized by way of a minor loading of the individual components.

The bearing plate on the lower side may comprise bearing blocks. The bearing blocks protrude at the bottom of a base plate of the bearing plate. The bearing blocks are disposed in a same grid as the components. The bearing blocks comprise bearing faces, wherein the bearing faces are provided to bear on the components. For example, the bearing blocks comprise a shape approximately identical and/or a size approximately identical to that of the upper sides of the components. However, it is advantageous for the bearing blocks to at least completely cover the upper sides of the components. It can be avoided in this way that the components are covered with molding material. By providing the bearing blocks, the bearing pressure can be transmitted directly from the bearing plate onto the upper sides of the components. A positive distribution of the bearing pressure across the individual components without damaging the components can thus be achieved in particular in the configuration of the base plate and/or the bearing blocks from resilient material.

The bearing blocks may be resiliently connected to the base plate of the bearing plate. This example offers a certain mobility of the bearing blocks even in a rigid base plate. If the base plate per se is formed from a resilient material, the resilient connection of the bearing blocks to the bearing plate can achieve a further increase in the flexibility of the bearing blocks. Both a height position of the bearing blocks and/or an inclination of the bearing blocks in relation to the components can thus be better adapted.

The bearing blocks can be connected to the bearing plate by way of spring elements. The spring elements can be configured in the form of leaf springs or in the form of disk springs, for example. The spring elements can be connected to the bearing blocks and the bearing plate by way of an adhesive bond or a weld.

Mold material may be filled as molding material into the intermediate space. For example, a silicone/glass composite can be used as the mold material. With the aid of the mold material, a molding method can be used to produce the layer.

A film may be disposed between the molding tool and the components, or between the molding tool and the intermediate space, respectively. The film protects the molding tool from wetting by molding material. Moreover, the film is formed from an elastic material and thus represents an elastic member between the molding tool and the components. The film can comprise a thickness of 40 µm, for example.

For the method to be carried out, a molding tool which in a simple example comprises a bearing plate, wherein the bearing plate comprises resilient bearing regions is proposed. The resilient bearing regions are provided to be brought to bear on components. The components can be disposed on a carrier. The bearing plate is moreover configured to delimit an intermediate space to fill molding material between the bearing plate, the components, and the carrier. By providing the resilient bearing regions, dissimilar height positions of the components or dissimilar inclinations of the upper sides of the components can be covered by way of a lower pressure and with a higher reliability. The application of molding material to the upper sides of the components can thus be positively avoided.

The molding tool may comprise a compression plate, wherein the compression plate on the lower side comprises bearing elements. The bearing elements are disposed to be mutually spaced apart. The compression plate by way of the bearing elements bears on an upper side of the bearing plate. On account of the bearing elements, the pressure is transmitted to the bearing plate. An unevenness of the bearing plate can be equalized by the bearing elements for a uniform distribution of pressure to be provided. The lower side of the bearing plate comprises resilient bearing regions. The bearing regions are provided to be brought to bear on the components. The bearing plate can moreover be configured to flex in the regions between the components.

The bearing plate on the lower side may comprise bearing blocks. The bearing blocks are disposed to be mutually spaced apart. The bearing blocks comprise bearing faces to bear on the components.

The bearing blocks may be resiliently connected to the bearing plate. The flexibility of the bearing blocks can be increased on account thereof. Comparatively large unevennesses or comparatively large height differentials between the upper sides of the components can thus be equalized by way of fewer pressure peaks on the individual components.

The bearing plate may be formed from a resilient material, in particular from a spring steel. On account of the resilient configuration of the bearing plate, the pressure equalization to bear on dissimilarly high components and/or on dissimilarly inclined surfaces of the components is improved.

The molding tool can comprise a film disposed between the molding tool and the components, or between the molding tool and the intermediate space, respectively. In this way the molding tool is protected from wetting by molding material. The film can moreover be formed from an elastic material that additionally increases the resilient properties of the molding tool.

The properties, features, and advantages described above, and the manner how the properties, features, and advantages are achieved, will become clearer and more readily understandable in the context of the description hereunder of examples explained in more detail in conjunction with the drawings.

FIG. 1 shows a schematic cross-section through a device that embeds opto-electronic components 1 in a layer. A molding tool 2 comprises a cover plate 3 and a bearing plate 4 is provided. A film 5 is moreover disposed on the lower side of the bearing plate 4. The film 5 herein covers the entire lower side of the bearing plate 4 and is thus disposed between the bearing plate 4 and the components 1. The film 5 can be dispensed with, for example. The opto-electronic components 1 are configured as radiation-emitting components, for example. For example, the opto-electronic components 1 can be configured in the form of light-emitting diodes. The components 1 are disposed on a carrier 6.

The bearing plate 4 in this example illustrated is formed from a resilient material. The bearing plate 4 can be formed from a spring steel, for example. The bearing plate 4 comprises a lower side 7 which in the absence of loading is substantially planar. The lower side 7 of the bearing plate 4 is disposed on upper sides 8 of the components 1. The film 5 is disposed between the bearing plate 4 and the components 1, for example. The film 5 can be formed from an elastic material.

Bearing elements 10 of the compression plate 3 are disposed on an upper side 9 of the bearing plate 4. The bearing elements 10 in the form of pins lead out of a lower side of the compression plate 3. The bearing elements 10 are of identical length and disposed in a predefined grid. The bearing elements 10 can be disposed in a predefined grid. The compression plate 3 is disposed on the upper side of the bearing plate 4 such that at least part of the bearing elements 10, in particular all bearing elements 10, are disposed laterally of the components 1 in the regions between the components 1.

A pressure in the direction toward the bearing plate 4 is exerted on the compression plate 3. The bearing elements 10 press the bearing plate 4 against the upper sides 8 of the components 1. By virtue of the configuration of the bearing plate 4 from a resilient material, the lower side 7 of the bearing plate 4 between the components 1 can flex in the direction toward an intermediate space 11. The flexing can correspond to, for example, 1% to 5% or more of the thickness of the bearing plate. On account of the resilient example of the bearing plate 4, height differentials of the upper sides 8 of the components 1, or dissimilarly inclined upper sides 8 of the components 1, respectively, can be better covered by the bearing plate 4. For the layer to be configured, molding material is incorporated, in particular injected, into the intermediate space 11 between the components 1 and the carrier and the bearing plate 4. An injection-molding method, in particular a molding method, can be used to incorporate the molding material in the intermediate space 11. The bearing plate 4 can moreover comprise an encircling frame 12 that bears on the carrier 6 and laterally seals the intermediate space 11. However, an opening (not illustrated) by way of which the molding material can be incorporated is provided in the carrier 6 or in the frame 12. Plastics material or mold material, in particular a silicon/glass composite mixture can be used as the molding material, for example. After the layer is cured, the molding tool 2 conjointly with the film 5 can be removed from the layer having the embedded components 1.

Figure 2:
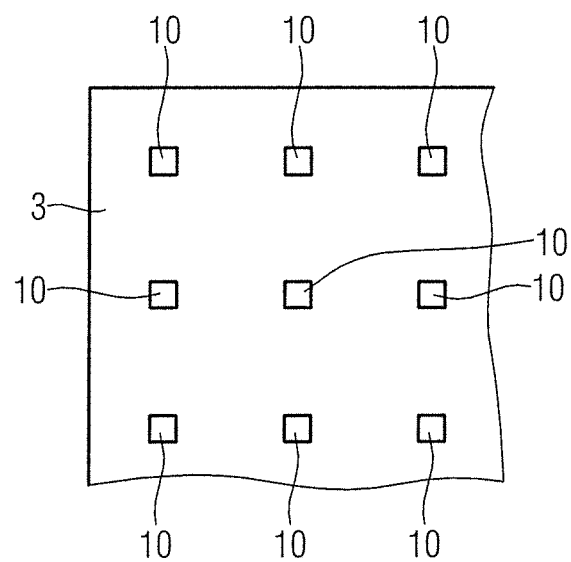
FIG. 2 shows a schematic partial view of the compression plate of the molding tool.

FIG. 2 schematically shows a partial fragment of a lower side of the compression plate 3. The bearing elements 10 protruding from the lower side of the compression plate 3 are schematically illustrated herein.

FIG. 3 in a schematic illustration shows a lower side of the bearing plate 4 having a film 5 which is illustrated to be transparent and which covers the entire bearing plate 4.

FIG. 4 in a schematic illustration shows the arrangement of the components 1 in the form of comparatively large squares, and the arrangement of the bearing elements 10 in the form of comparatively small squares. The components 1 in the example illustrated are disposed in a first uniform grid. The bearing elements 10 are disposed in a second uniform grid, wherein the bearing elements 10 are each disposed between the components 1. In this way, a uniform distribution of pressure on the bearing plate 4 and thus on the upper sides of the components 1 can be achieved.

Figure 5:
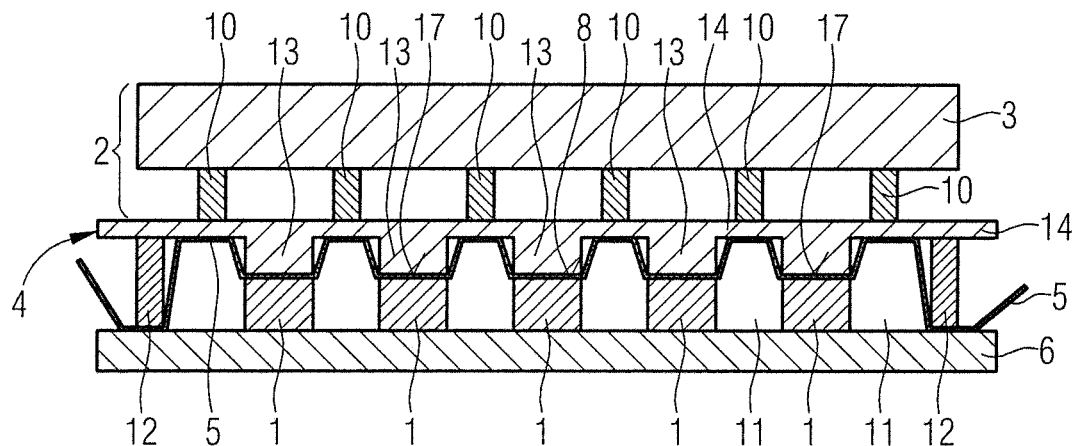
FIG. 5 shows a schematic cross section through a further example of a device for embedding the components in a layer.

FIG. 5 shows a schematic cross section through a further device that can be used to embed opto-electronic components in a layer. The arrangement corresponds substantially to the arrangement of FIG. 1, wherein the bearing plate 4 in this example, as opposed to the arrangement of FIG. 1, on the lower side comprises bearing blocks 13. The bearing blocks 19 are disposed on the upper sides 8 of the components 1. The bearing blocks 13 comprise bearing faces 17 covering at least the entire upper side 8 of the components 1. Moreover, depending on the example chosen, a film 5 can be provided between the bearing blocks 13 and the components 1, as is illustrated.

Figure 6:
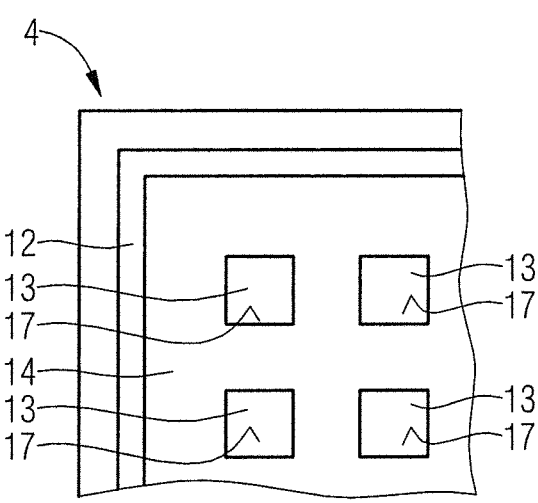
FIG. 6 shows a schematic partial view of a lower side of the bearing plate of FIG. 5.

FIG. 6 shows a schematic partial fragment of the lower side of the bearing plate 4 having the bearing blocks 13. The bearing plate 4 in this example can be formed from a resilient material from a rigid material. The bearing blocks 13 can be resiliently connected to a base plate 14 of the bearing plate 4. The bearing plate 4 in this example thus comprises a base plate 14, the bearing blocks 13 protruding on the lower side of the base plate 14. The bearing blocks 13 thus transmit the pressure of the compression plate 3 directly onto the upper sides 8 of the components 1. The bearing blocks 13 can be resiliently connected to the base plate 14. To this end, the bearing blocks 13 at least in the transition region toward the base plate 14 can comprise a correspondingly thin cross section such that pivoting of the bearing blocks 13 in relation to the base plate 14 is possible. On account thereof, dissimilar inclinations of the upper sides 8 of the components 1 can be equalized in a simple manner. The bearing blocks 13 are disposed in the same grid as the components 1 on the carrier 6. One bearing face 17 of one bearing block 13 can also cover a plurality of components 1.

Figure 7:
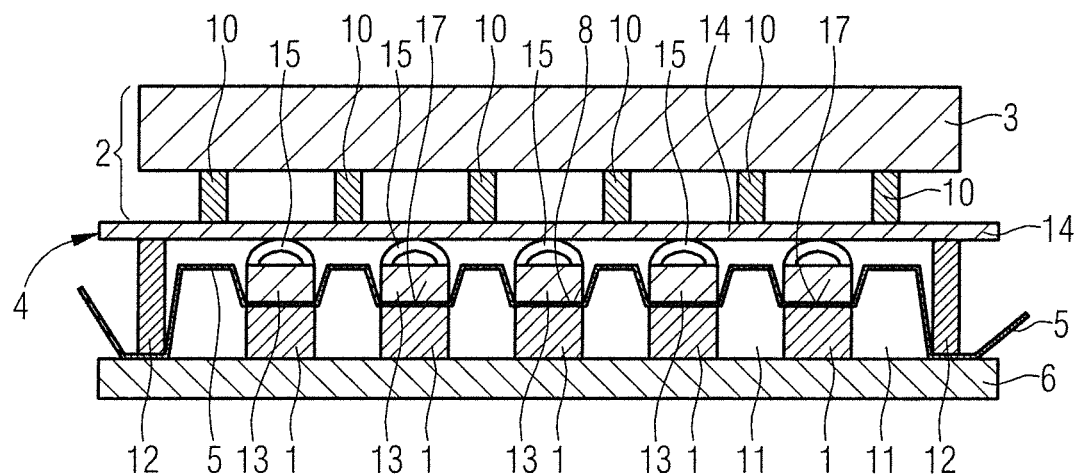
FIG. 7 shows a schematic cross section through a further example of a device that embeds components in a layer.

FIG. 7 shows a further example of a device that embeds opto-electronic components 1 in a layer, wherein this device is configured substantially according to FIG. 5. The device differs from the device of FIG. 5 in terms of the construction of the bearing plate 4. In this example of the bearing plate 4, the bearing blocks 13 are connected to the base plate 14 by way of spring elements 15. The spring elements 15 can be configured, for example, in the form of disk springs, leaf springs, or diaphragm springs, or in other shapes. The resilient mounting of the bearing blocks 13 is improved on account of the disposal of the spring elements 15 between the bearing blocks 13 and the base plate 14. Comparatively large inclinations and/or comparatively large height differentials between the upper sides 8 of the components 1 can thus be equalized. The spring elements 15 can be adhesively bonded and/or welded to the base plate 14 and/or to the bearing blocks 13.

Figure 8:
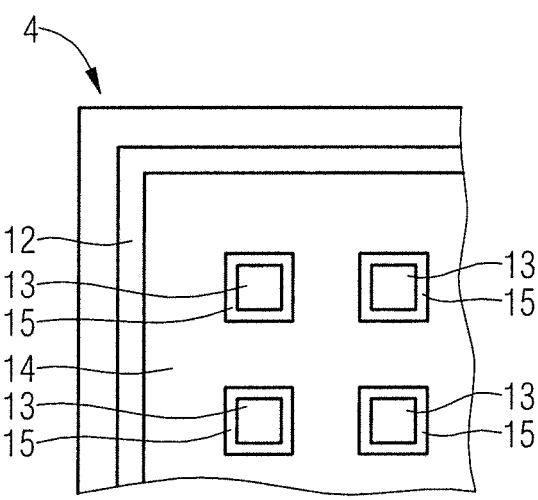
FIG. 8 shows a schematic partial view of the lower side of the bearing plate of FIG. 7.

FIG. 8 shows a schematic partial view of the lower side of the bearing plate 4 of FIG. 7. For improved clarity, the spring elements 15 are illustrated to be larger than the bearing blocks 13. This illustration does not necessarily correspond to the implemented example of the bearing blocks 13 and the spring elements 15.

Figure 9:
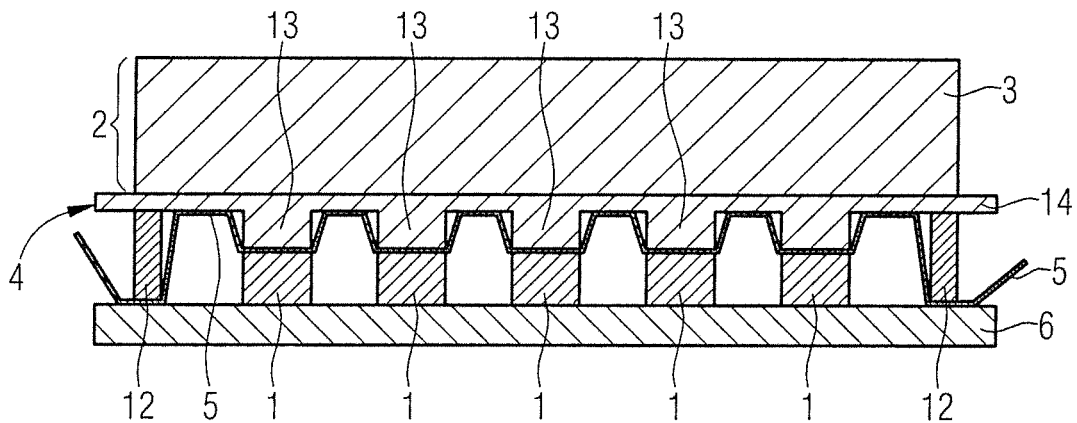
FIG. 9 shows a schematic cross section through a further example of a device that embeds components in a layer.

FIG. 9 shows a schematic cross section through a further example of a device that embeds opto-electronic components in a layer, wherein this device corresponds substantially to the device of FIG. 5. However, as compared to the device of FIG. 5, this device differs in that the compression plate 3 does not comprise any bearing elements 10 but possesses a planar lower side.

Figure 10:
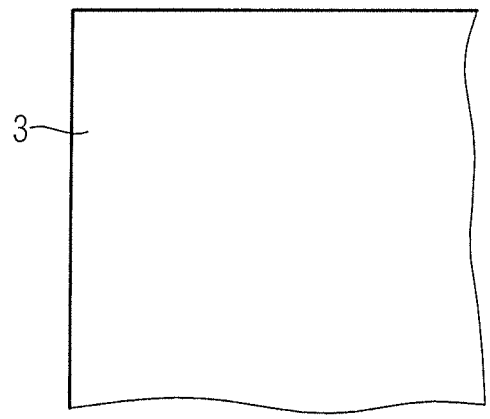
FIG. 10 shows a schematic partial view of the compression plate of FIG. 9. \

FIG. 10 shows a schematic plan view of the lower side of the compression plate 3. Providing bearing elements 10 is not required in this example by virtue of the resilient mounting of the bearing blocks 13 on the base plate 14 of the bearing plate 4. The bearing plate 4, in particular the base plate 14, can be formed from a resilient material also in this example.

Figure 11:
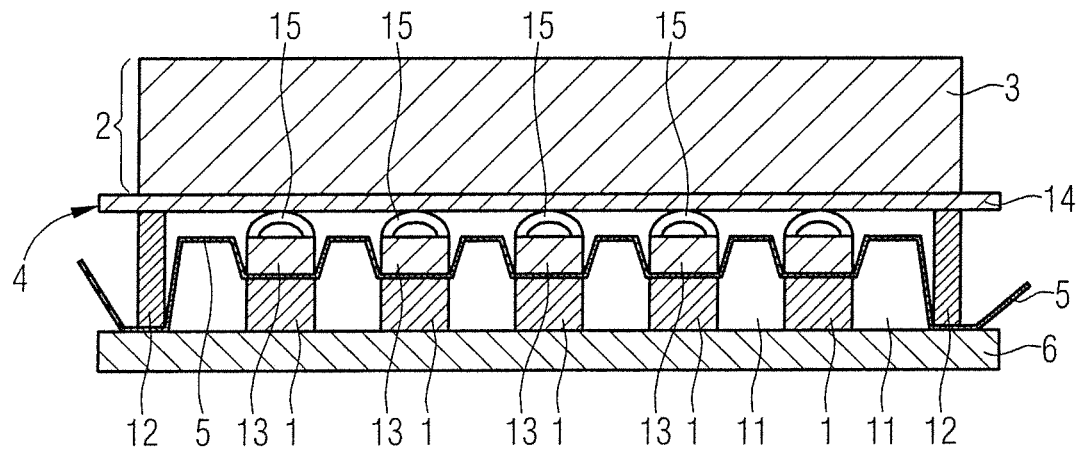
FIG. 11 shows a schematic cross section through a further example of a device that embeds components in a layer.

FIG. 11 shows a schematic cross section through a further example of a device embeds opto-electronic components in a layer, wherein this device corresponds substantially to the device of FIG. 7. As opposed to the example of FIG. 7, the compression plate 3 also in this example is configured in the form of a plate having a planar lower side according to FIG. 10. The resilient mounting of the bearing blocks 13 with the aid of the spring elements 15 on the base plate 14 of the bearing plate 4 enables a compression plate 12 of simpler design to be used.

Figure 12:
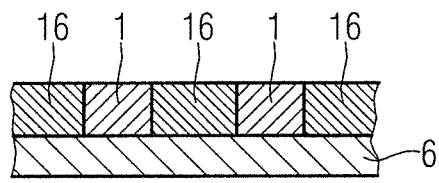
FIG. 12 shows a schematic partial section through a layer having embedded components.

FIG. 12 shows a schematic cross-section through an arrangement having a carrier 6 on which components 1 are disposed, wherein the components 1 are embedded in a layer 16 of molding material. This arrangement has been produced using one of the devices of FIGS. 1 to 11, for example.

Figure 13:
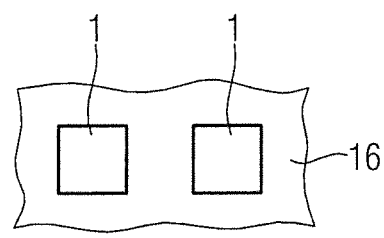
FIG. 13 shows a schematic partial view of an upper side of the layer of FIG. 12.

FIG. 13 shows a schematic plan view of a fragment of an arrangement having a carrier 6 on which components 1 are disposed, wherein the components 1 are embedded in a layer 16 of molding material.

Depending on the device used, the layer 16 can also protrude beyond the upper sides 8 of the components 1. However it is prevented by virtue of the devices used that the upper sides 8 of the components 1 are per se covered by the layer 16.

Figure 14:
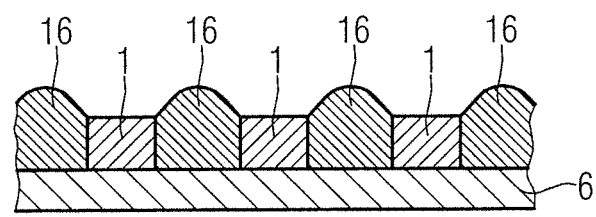
FIG. 14 shows a schematic partial view through a further layer having embedded components.

FIG. 14 shows a cross section through a corresponding arrangement of a carrier 6 on which components 1 are disposed, wherein the layer 16 protrudes beyond the upper sides 8 of the components 1. This arrangement has been produced using a device according to FIG. 5, 7, 9, or 13, for example.

Our methods have been illustrated and described in detail by preferred examples. This disclosure is nevertheless not limited to the disclosed examples. Rather, other variations can be derived therefrom by those skilled in the art without departing from the scope of protection of the appended claims.

The invention claimed is:

1. A method of embedding opto-electronic components in a layer, wherein the components are disposed beside one another to be spaced apart on a carrier, comprising:
   providing a molding tool having a bearing plate, wherein the bearing plate on a lower side comprises resilient bearing regions,
   bringing the bearing plate by way of the resilient bearing regions to bear on upper sides of the components,
   filling an intermediate space between the components, the carrier, and the bearing plate with a molding material, curing the molding material to form the layer, and
   removing the molding tool from the layer and the embedded components,
   wherein the molding tool comprises a compression plate, the compression plate on a lower side comprises bearing elements, the bearing elements are mutually spaced apart, the compression plate by way of the bearing elements bears on an upper side of the bearing plate, and when filling the molding material into the intermediate space the compression plate by way of the bearing elements presses the bearing plate against the components,
   the bearing elements have the form of pins lead out of a lower side of the compression plate,
   the bearing elements are disposed on an upper side of the bearing plate, and
   the bearing elements are disposed laterally of the components in the regions between the components.

2. The method according to claim 1, wherein the bearing plate is formed from a resilient material, the lower side of the bearing plate represents the resilient bearing regions, and the bearing elements of the compression plate are disposed to be at least in part laterally offset in relation to the components.

3. The method according to claim 1, wherein the bearing plate on the lower side comprises bearing blocks, the bearing blocks are disposed in the same grid as the components, the bearing blocks comprise bearing faces, and a bearing face of a bearing block is each disposed above an upper side of a component.

4. The method according to claim 3, wherein the bearing blocks are resiliently connected to the bearing plate.

5. The method according to claim 4, wherein the bearing blocks are connected to the bearing plate by way of spring elements.

6. The method according to claim 1, wherein a film is disposed between the molding tool and the components, the film bears on the upper side of the components, the film is disposed between the intermediate space and the molding tool, and the film protects the molding tool from wetting by molding material.

7. The method of claim 1, wherein a pressure in a direction toward the bearing plate is exerted on the compression plate by the bearing elements, the bearing elements press the bearing plate against upper sides of the components, and by the configuration of the bearing plate from a resilient material, the lower side of the bearing plate between the components flexes in a direction toward an intermediate space between the components.

8. The method of claim 7, wherein flexing of the bearing plate in the direction toward the intermediate space between the components can correspond to 1% to 5% or more of the thickness of the bearing plate.

* * * * *